Jan. 6, 1925.

G. A. HUNTER

PUMP COUPLING

Filed Aug. 5, 1921

1,521,815

Inventor
George A. Hunter,
By his Attorneys,
Fraser, Fuke & Myers

Patented Jan. 6, 1925.

1,521,815

UNITED STATES PATENT OFFICE.

GEORGE A. HUNTER, OF QUEENS, NEW YORK, ASSIGNOR TO A. SCHRADER'S SON, INCORPORATED, OF BROOKLYN, NEW YORK, A CORPORATION OF NEW YORK.

PUMP COUPLING.

Application filed August 5, 1921. Serial No. 490,046.

*To all whom it may concern:*

Be it known that I, GEORGE A. HUNTER, a citizen of the United States of America, residing at Queens, in the county of Queens and State of New York, have invented certain new and useful Improvements in Pump Couplings, of which the following is a specification.

This invention relates to pump couplings or the like for pneumatic tire valves, and aims to provide certain improvements therein.

The invention is particularly directed to a quickly attachable and detachable coupling which may be slipped down over the tire valve and connected therewith in a leak-tight manner by a short turn of the coupling.

According to the present invention in its preferred form, the coupling comprises a shank or the like having a passage through it adapted to aline with the passage of the tire valve, a packing washer or its equivalent adapted to make contact with the top of the valve nipple, and a quickly applicable clamping device for connecting such parts to the tire valve. By preference between the clamping device and the shank portion there is located a spring element which holds the packing washer in engagement with the valve nipple by spring pressure and the clamping device is preferably in the form of a swivelled sleeve adapted to engage the body of the valve. The invention includes other features of improvement which will be hereinafter more fully described.

Referring to the drawings, which illustrate one form of the invention,—

Figure 1:
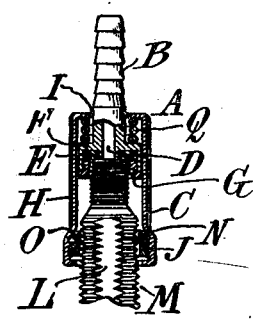
Figure 1 is a diametrical section of the device shown as applied to a tire valve.
Figure 3:
Fig. 3 is an elevation, partly in section, of the packing holder.

Referring to the drawings, let A indicate the coupling as a whole which is shown as comprising a shank member B and a clamping member C.

Figure 2:
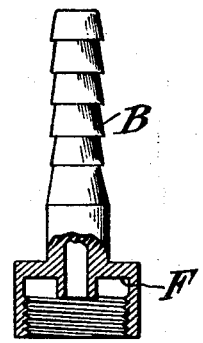
Fig. 2 is an elevation, partly in section, of the shank member.
Figure 4:
Fig. 4 is a diametrical section of the packing.
Figure 6:
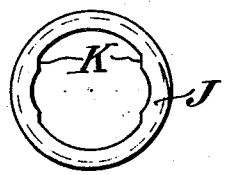
Fig. 6 is a view of the actuating ring.
Figure 5:
Fig. 5 is a side elevation of the spring.

The shank member B has the usual shank for connection with the pump tube, a central bore D, and a packing washer E. The packing washer is preferably located in a recess F (Fig. 2), and is held in place by a screw-threaded sleeve G which is adapted to engage a similar thread on the shank member.

Figure 7:
Fig. 7 is a plan of the clamping ring.

The clamping member C as shown in its preferred form comprises a sleeve H which is provided at its upper end with an aperture through which the shank passes. At the lower end of the sleeve is provided a clamping means which is shown as comprising a screw-threaded ring J engaging similar threads on the interior of the sleeve H, and being provided with flats K designed to engage the flats L of the tire valve M. N is a clamping ring, best shown in Fig. 7, which is adapted to be contracted to engage the exterior of the tire valve when there is a relative rotary motion between the sleeve and the ring J. In the construction illustrated a tapered face O is formed on the sleeve above the ring J and as the sleeve is rotated the ring J is caused to travel upwardly (being prevented from rotation by the flats K), thus forcing the clamping ring N against the taper O, and contracting it so that it engages the threads of the tire valve.

By preference I locate a spring element between the sleeve and the shank member in order that an initial pressure may be put upon the packing E before the coupling is clamped to the valve. Such spring element is shown as a spiral spring Q arranged between the top of the sleeve and the shank member.

In operation the coupling is applied to the valve and the sleeve C is pressed downwardly until the spring Q is compressed, whereupon the sleeve is turned slightly to clamp the device to the valve. A slight reverse turn is sufficient to release the coupling from the valve. The degree of movement necessary to attach and detach it depends upon the thread of the ring J and the inclination of the taper O. Usually one-half a turn or less is sufficient.

While I have shown and described one form of the invention, it will be understood that I do not wish to be limited thereto, since various changes may be made therein without departing from the spirit of the invention. It is obvious that the invention may be applied to other constructions, such as dust caps or similar devices.

What I claim is:—

1. The combination of a part carrying a packing adapted to engage the end of a tire valve, and the like, and a quickly detachable clamping device comprising contractile spring means adapted by a rotary movement of the device to engage the casing of the tire valve.

2. The combination of a part carrying a packing adapted to engage the end of a tire valve or the like, a quickly detachable clamping device comprising contractile means adapted by a rotary movement of the device to engage the casing of the tire valve, and a spring interposed between said clamping device and said part.

3. The combination of a part carrying a packing, a sleeve connected with said part, a clamping means, means for engaging the tire valve adapted upon a relative rotary movement with the sleeve to operate said clamping means, and a spring interposed between said part and said sleeve.

4. The combination of a shank member and a packing, a spring above said packing, a sleeve engaging said spring, means comprising a contractile member carried by the sleeve for engaging a tire valve, cooperating with the sleeve, and means for contracting the member to engage the thread of the tire valve casing said means being operable by rotation of the sleeve.

5. The combination of a shank member having a packing, a spring above said packing, a sleeve engaging said spring and extending below the packing, a threaded ring engaging said sleeve, and a clamping ring adapted to be contracted by said sleeve and ring.

In witness whereof, I have hereunto signed my name in the presence of two subscribing witnesses.

GEORGE A. HUNTER.

Witnesses:
G. J. SANSOM,
E. E. BUECHNER.